US00RE47925E

(19) United States
(12) Reissued Patent
Torma

(10) Patent Number: US RE47,925 E
(45) Date of Reissued Patent: Mar. 31, 2020

(54) METHOD AND MULTI-CAMERA PORTABLE DEVICE FOR PRODUCING STEREO IMAGES

(71) Applicant: LATERAL REALITY KFT., Budapest (HU)

(72) Inventor: Péter Torma, Zsámbéká (HU)

(73) Assignee: LATERAL REALITY KFT., Budapest (HU)

(21) Appl. No.: 16/283,214

(22) Filed: Feb. 22, 2019

Related U.S. Patent Documents

Reissue of:
(64) Patent No.: 9,615,081
Issued: Apr. 4, 2017
Appl. No.: 14/532,902
Filed: Oct. 26, 2014

U.S. Applications:
(60) Provisional application No. 61/896,168, filed on Oct. 28, 2013.

(51) Int. Cl.
*H04N 13/239* (2018.01)
*H04N 13/296* (2018.01)

(52) U.S. Cl.
CPC ..... *H04N 13/239* (2018.05); *H04N 13/296* (2018.05)

(58) Field of Classification Search
CPC ..... H04N 13/0239; H04N 13/0203; H04N 13/0246; H04N 13/0296; H04N 13/239; H04N 13/296
See application file for complete search history.

(56) References Cited

U.S. PATENT DOCUMENTS 5,886,735 A * 3/1999 Bullister ..... H04N 7/142 348/14.01
8,189,100 B2 5/2012 Li et al.
2011/0001793 A1 1/2011 Moriyama et al.
2011/0007205 A1* 1/2011 Lee ..... H04N 5/2252 348/369

(Continued)

OTHER PUBLICATIONS

Wu et al. "Epipolar geometry of catadioptric stereo systems with planar solutions," 2009 image and vision computing, 2009, vol. 27, pp. 1047-1061.*

(Continued)

*Primary Examiner* — Peng Ke
(74) *Attorney, Agent, or Firm* — Flaster Greenberg PC

(57) ABSTRACT

A method and a multi-camera portable device for producing stereo images. The device has at least two image sensors, at least one of which is arranged on a first face of the portable device and a second one of which is arranged on a second face of the portable device opposite to the first face thereof. The method involves substantially simultaneously recording a first image containing a picture of an object and a second image containing a picture of a mirrored view of the object, obtaining the direction and the length of a mirroring vector from the distance ratio of a first distance in reality and a corresponding second distance in the second image, obtaining a capturing focal length of the second image sensor, and transforming the coordinate system of the first image sensor into the coordinate system of the virtual second image sensor to generate a stereo image pair.

20 Claims, 5 Drawing Sheets

(56) References Cited

U.S. PATENT DOCUMENTS

| | | | | |
|---|---|---|---|---|
| 2012/0026298 | A1 | 2/2012 | Filo et al. | |
| 2012/0098938 | A1 | 4/2012 | Jin | |
| 2012/0320152 | A1* | 12/2012 | Seok | G06T 7/0075 348/42 |
| 2013/0135445 | A1 | 5/2013 | Dahi et al. | |
| 2014/0198976 | A1* | 7/2014 | Coffman | G06T 7/0075 382/154 |
| 2014/0307101 | A1* | 10/2014 | Cobb | H04N 5/45 348/169 |
| 2015/0103146 | A1* | 4/2015 | Rose | H04N 13/0239 348/47 |

OTHER PUBLICATIONS

Gluckman, et al., "Catadioptric stereo Using Planar Mirrors", International Journal on Computer Vision, 2001, vol. 44(1), Jan. 12, 2001, pp. 65-79.

* cited by examiner

METHOD AND MULTI-CAMERA PORTABLE DEVICE FOR PRODUCING STEREO IMAGES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a broadening reissue of U.S. Pat. No. 9,615,081, issued Apr. 4, 2017, which corresponded to U.S. patent application Ser. No. 14/523,902, filed Oct. 24, 2014, and which* claims priority to U.S. Provisional Application No. 61/896,168 filed Oct. 28, 2013. *Co-pending U.S. patent application Ser. No. 16/780,593, filed Feb. 3, 2020, was filed as a reissue continuation application of this application, meaning it is both a continuation of this U.S. patent application Ser. No. 16/283,214, filed Feb. 22, 2019, and is also a reissue of U.S. Pat. No. 9,615,081, issued Apr. 4, 2017.*

FIELD OF THE INVENTION

The invention generally relates to the production of stereo images. More particularly, the present invention relates to a method and a multi-camera portable device for producing stereo images with using an external mirror.

BACKGROUND OF THE INVENTION

The distance between a camera and a spatial point in a scene can be determined or well estimated from the position of the point within two or more associated images showing the same point, wherein the associated images are captured simultaneously. The distance calculation is still possible if one or more mirrors are arranged in the scene, and some of the images are captured in the mirror. The three dimensional (3D) position of a point can be computed from basic geometric relationships when the spatial relationship between the image recording device and the position and the parameters of the reflecting surfaces (e.g. mirrors) are known. The challenge in computing an unknown distance from multiple images using reflecting surfaces is called catadioptric stereo vision. In J. Gluckman and S. K. Nayar: Catadioptric Stereo Using Planar Mirrors (International Journal on Computer Vision, 44(1), pp. 65-79, August 2001), the basic theory of catadioptric stereo image generation is described. In such a process, only one camera and a flat mirror with a known position relative to the camera are used.

The U.S. Pat. No. 8,189,100 discloses a portable device comprising a first image sensor, a second image sensor configured to change position with respect to the first image sensor, a controller configured to control the position of the second image sensor, and an image processing module configured to process and combine images captured by the first and second image sensors. Although this device is equipped with two image sensors to produce, for example, a stereo image, both of the image sensors directly capture an image of the real object, and no external mirror is used in the image generation process.

Since nowadays most of the portable communication or computing devices, such as mobile phones or tablets, are usually equipped with two cameras, typically on their opposite sides, i.e. a front camera and a rear camera, there is a need of using such devices to produce a depth image for a particular object.

SUMMARY OF THE INVENTION

It is an object of the present invention to provide a method for producing stereo images by using a mirror and a multi-camera portable device having at least two image sensors on its opposite faces, wherein said multi-camera portable device is arranged at an arbitrary distance from the mirror with an arbitrary orientation.

It is another object of the present invention to provide a multi-camera portable device configured to produce stereo images by performing the method of the invention.

These and other objects are achieved by providing a method for producing a stereo image of an object with using a multi-camera portable device having at least two image sensors, at least a first one of said image sensors being arranged on a first face of the portable device and a second one of said image sensors being arranged on a second face of the portable device opposite to the first face thereof, the method comprising the steps of:

- arranging the object in front of the first image sensor so that the object falls within the field of view of the first image sensor,
- arranging an external mirror in front of the second image sensor so that a mirrored view of the object and a mirrored view of the portable device fall within the field of view of the second image sensor,
- substantially simultaneously recording, by the first image sensor, a first initial image containing, a picture of the object, and by the second image sensor, a second initial image containing (i) a picture of the mirrored view of the object appearing in the mirror and (ii) a picture of at least a portion of the mirrored view of the portable device appearing in the mirror, thereby producing an initial pair of images,
- finding the center of the picture of the mirrored view of the second image sensor within the second initial image,
- determining the distance ratio of a first distance between two points of the portable device in reality and a second distance of the respective points in the second initial image for obtaining the direction and the length of a mirroring vector, which points from the center of the second image sensor to the center of the virtual second image sensor,
- obtaining a capturing focal length of the second image sensor, and
- by using said mirroring vector and the capturing focal length of the second image sensor, transforming the coordinate system of the first image sensor into the coordinate system of the virtual second image sensor to generate a stereo image pair from the first initial image and the second initial image for the object.

The above objects are further achieved by providing a multi-camera portable device comprising at least two image sensors at opposite faces thereof, and further comprises at least a processor unit, a memory unit, a non-transitory data storage medium, a display unit and an input unit, wherein the multi-camera portable device is adapted to substantially simultaneously record, by its first image sensor, a first initial image containing a picture of an object arranged within the field of view of the first image sensor, and by its second image sensor, a second initial image containing (i) a picture of a mirrored view of the object appearing in a mirror and (ii) a picture of at least a portion of a mirrored view of the multi-camera portable device itself appearing in the mirror, thereby producing an initial pair of images, wherein said mirrored view of the second image sensor and said portion of the mirrored view of the multi-camera portable device are arranged within the field of view of the second image sensor.

Finally, the above objects are also achieved by providing a non-transitory data storage medium comprising a set of processor-readable instructions, said instructions being adapted, when executed by a processor of a multi-camera portable device, to carry out the steps of:

instructing a first image sensor of the device to record a first initial image containing a picture of an object arranged within the field of view of the first image sensor, and a second image sensor of the device to substantially simultaneously record a second initial image containing (i) a picture of a mirrored view of the object appearing in a mirror and (ii) a picture of at least a portion of a mirrored view of the multi-camera portable device itself appearing in the mirror, thereby to produce an initial pair of images, wherein said mirrored view of the second image sensor and said portion of the mirrored view of the device are arranged within the field of view of the second image sensor, finding the center of the picture of the mirrored view of the second image sensor within the second initial image, determining a distance ratio of a first distance between two points of the device in reality and a second distance of the respective points in the second initial image for obtaining a direction and a length of a mirroring vector, which points from the center of the second image sensor to the center of the virtual second image sensor, obtaining a capturing focal length of the second image sensor, and by using said mirroring vector and the capturing focal length of the second image sensor, transforming the coordinate system of the first image sensor into the coordinate system of the virtual second image sensor to generate a stereo image pair from the first initial image and the second initial image for the object.

DETAILED DESCRIPTION OF THE INVENTION

The invention will now be described in detail through preferred embodiments with reference to the accompanying drawings.

Within the context of the present description, the term "image" means the product of image capturing performed by an imaging device, such as an image sensor or a camera, while the term "picture" means a visual representation of an object or person within a captured image. An image may be a still image or a frame of a video sequence (also referred to as video image).

Furthermore, within the context of the present invention, the term "virtual" is used in optical sense for any object that is apparently located in a mirrored space behind a mirror.

Figure 1:
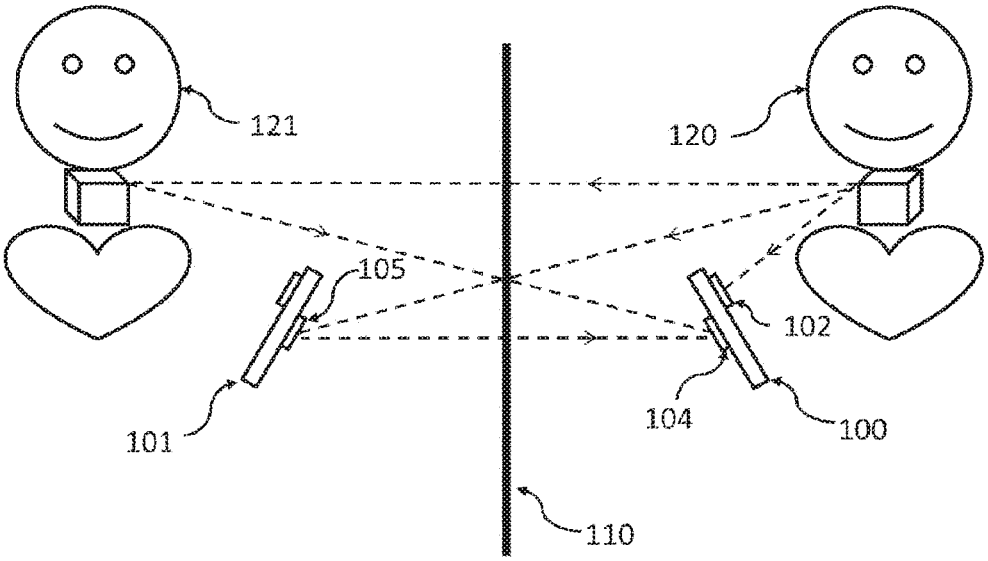
FIG. 1 schematically illustrates the optical scheme of the image capturing arrangement including an object, a dual-camera portable device and a mirror.
Figure 3:
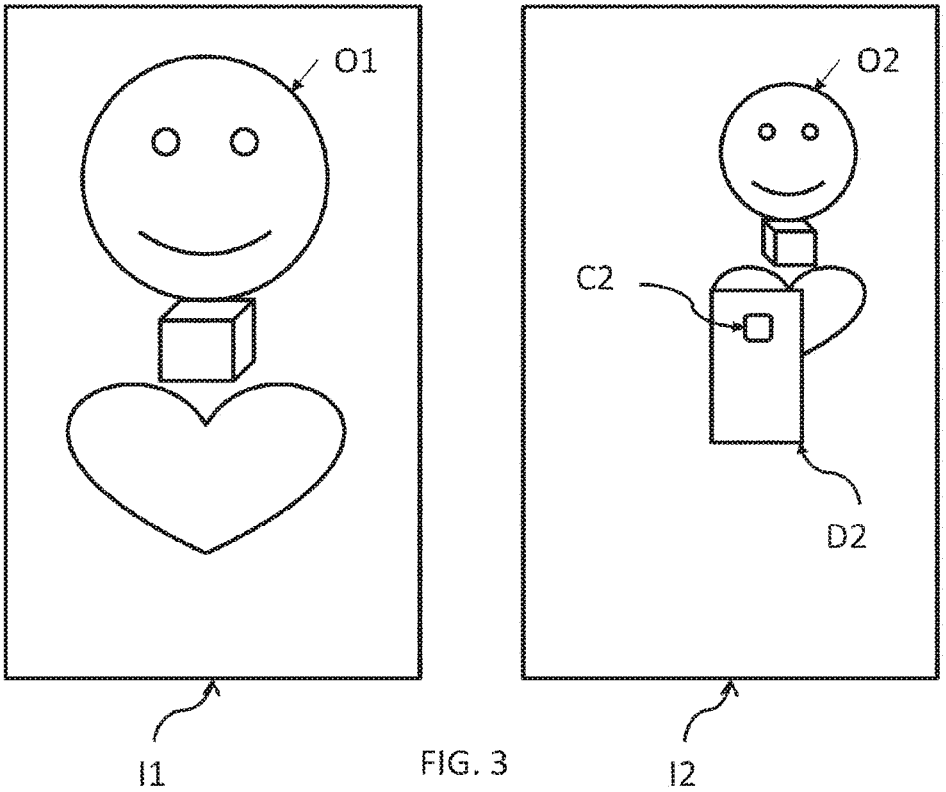
FIG. 3 shows an exemplary pair of the initial images captured by two cameras of a multi-camera portable device.

FIG. 1 schematically illustrates the image capturing arrangement according to the present invention, which includes a multi-camera portable device 100 equipped with at least two cameras 102, 104, a mirror 110 and an object 120 for which a stereo image is to be produced.

The portable device 100 has at least two cameras (or image sensors), at least one being arranged on a first face of the multi-camera portable device 100 and at least one other one being arranged on a second face of the portable device 100, the second face being opposite to the first face. It is particularly preferred that for the multi-camera portable device 100, a dual-camera portable device equipped with a front camera 102 and a rear camera 104 is used. The multi-camera portable device 100 may be any kind of portable communication or computing device equipped with a front camera and a rear camera, such as a mobile phone, a smart phone, a phablet, a tablet PC, a notebook, or the like, or any kind of other multi-camera device with more than two cameras and adapted for producing a stereo image.

The cameras 102, 104 of the portable device 100 may capture still image snapshots and/or video sequences.

An object 120, for which a stereo image is to be produced, is arranged on either side of the portable device 100 so that a first one of the cameras 102 can directly record a first image showing said object. A mirror 110 is arranged on the opposite side of the portable device 100 so that the second camera 104 can record a second image showing a mirrored view of the object that appears in the mirror 110.

The portable device 100, the mirror 110 and the object 120 must be arranged with respect to each other so that the real object 120 falls within the field of view of the first camera 102, while a virtual counterpart of the object 120 accommodating in the mirrored space, i.e. the virtual object 121, and a virtual counterpart of the portable device 100 accommodating in the mirrored space, i.e. the virtual device 101, fall within the field of view of the second camera 104.

Figure 2:
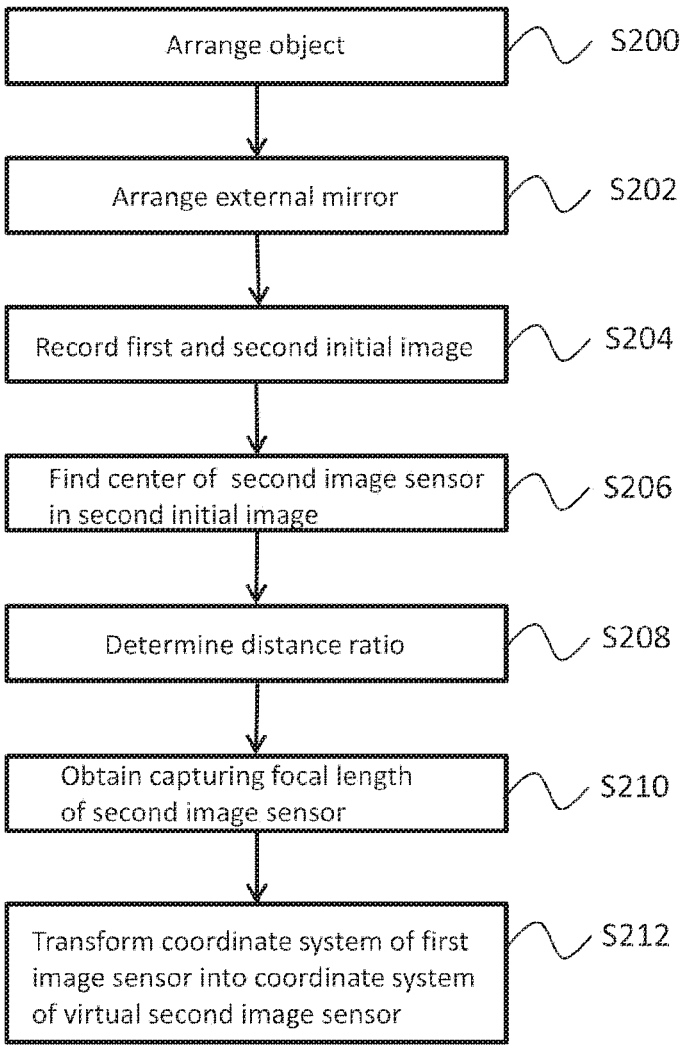
FIG. 2 is a flow diagram showing the major steps of the method according to the invention.

The major steps of the method of producing stereo images from an initial image pair of images captured by the first and second cameras are shown in the flow diagram of FIG. 2 and will be explained with reference to FIG. 1, which also presents the basic geometric concept applied in the stereo image generation scheme according to the present invention, as well as to FIGS. 3 to 7 illustrating various stages of the image processing.

In the initial steps S200 and S202 of the method, a mirror 110 and an object 120 are arranged with respect to the multi-camera portable device 100 having at least two image sensors or cameras as described above and shown in FIG. 1, wherein the mirror 110 is arranged in front of said second camera 104 of the portable device 100 and the object 120 is arranged in front of the first camera 102 of the portable device 100, said first and second cameras 102, 104 being on the opposite faces of the device 100

Next, in step S204, still images are captured by both of the first and second cameras 102, 104 simultaneously, or at time points substantially close to each other, in order to record an initial pair of associated images I1 and I2. In case of recording a video sequence, the two cameras 102, 104 may be synchronized. As a result of image capturing, a first initial image I1 containing at least a picture O1 of the real object 120 and a second initial image I2 containing a picture D2 of the mirrored view of the portable device 100, a picture O2 of the mirrored view of the real object 120 are recorded. An example of such an initial pair of images I1, I2 can be seen in FIG. 3, wherein within the image I1, the picture O1 of the real object 120 is shown, while within the image I2, the picture O2 of the mirrored view of the object 120 and a picture D2 of the mirrored view of the portable device 100 (together with a picture C2 of the mirrored view of the second camera 104) as appearing in the mirror 100 are shown.

Using the thus obtained pair of initial images I1, I2, the coordinate transformation that maps the coordinate system of the first camera 102 into the coordinate system of the virtual second camera 105 (shown in FIG. 1) is determined to allow to match the initial images I1 and I2 for stereo image generation. This coordinate transformation is performed by a so called fundamental matrix F.

Construction of the fundamental matrix F is based on the following definitions and equations. For projecting a picture point shown in a captured image into the coordinate system of the capturing camera the following equations are used.

Let Q be a point in the (either the real or the mirrored) space and let p denote a respective pixel in the captured image. The pixel coordinates $p_x, p_y$ may be defined in the camera's coordinate system by the equations:

$$p_x = Q_x \frac{f}{sQ_z}$$

$$p_y = Q_y \frac{f}{sQ_z}$$

where f is the focal length of the capturing camera and s is the pixel size on the image sensors of the portable device. Generally, this parameter is specified by the manufacturer of the image sensor and its value is typically about 1 micron.

For making the following calculations easier, a relative focal length H is defined as the ratio of the focal length and the pixel size:

$$H = \frac{f}{s}$$

Due to the equations, during the subsequent calculations, it will not be necessary to know the specific values of f and s for a captured image, but it will be enough to know only their ratio, which is available in most cases in practice.

For the construction of the fundamental matrix F, a first matrix transformation that maps the coordinate system of the first camera 102 into the coordinate system of the second camera 104, and a second matrix transformation that maps the coordinate system of the real second camera 104 into the coordinate system of the virtual second camera 105 are to be obtained. The first transformation is defined by a device matrix K, which is a constant matrix characteristic to any particular portable device 100, whereas the second one is defined by a mirror transformation matrix M that should be determined using the captured initial images I1, I2.

The mirror transformation matrix M depends only on a vector m that points from the focal point of the second camera 104 to the focal point of the virtual second camera 105. The mirror transformation matrix M has the following well-known form:

$$M = \begin{pmatrix} I - \frac{2}{\|m\|^2} mm^T & m \\ 0 & 1 \end{pmatrix}$$

wherein I is a 3 by 3 identity matrix. The matrix M, which is a 4 by 4 homogenous transformation matrix, is mapping in the 3D homogenous coordinate system. The vector m depends on four parameters, i.e. the center point $(c_x, c_y)$ of the picture C2 of the mirrored view of the second camera 104 on the second initial image I2, the relative focal length $H_2$ of the second camera 104 and the ratio of the distance $d_{u_1,u_2}$ between two points $u_1$, $u_2$ of the portable device 100 and the corresponding distance $(d_{U_1,U_2})$ between the respective image points $U_1$, $U_2$ appearing in the second initial image I2.

$$m = \begin{pmatrix} m_x \\ m_y \\ m_z \end{pmatrix} = \frac{d_{u_1,u_2}}{d_{U_1,U_2}} \begin{pmatrix} c_x \\ c_y \\ H_2 \end{pmatrix}$$

The fundamental matrix F (that is mapping from the first camera 102 to the virtual second camera 105) is a matrix product of the mirror transformation matrix M and the device matrix K.

$$F = M(m)K = M\left(c_x, c_y, \frac{d_{u_1,u_2}}{d_{U_1,U_2}}, H_2\right)K$$

Consequently, for determining the fundamental matrix F, the camera center $(c_x, c_y)$, the aforementioned distance ratio $$\frac{d_{u_1,u_2}}{d_{U_1,U_2}}$$

of two points and the relative focal length $H_2$ of the second camera 104 is to be determined. To this end, the following steps are taken:

1) First, in step S206, the centre $(c_x, c_y)$ of the picture C2 of the mirrored view of the second camera 104 is found in the image I2 by the following steps.

(i) A sub-image Is of the second initial image I2 that is most similar to the first image I1 is found within the second image I2. The sub-image Is may be sought by measuring the quality of the match between the sub-image Is and the selected portion of the second initial image I2. For quality measurement of the matching, a simple colour correlation between several appropriately selected sub-images Is and the first initial image I1 may be calculated. This calculation is preferably performed in a multi-scale approach; first finding the good matches on a rough scale, and then checking and adjusting the highest quality matches on finer scales. This matching step results in at least one sub-image Is, but preferably a plurality of candidate sub-images Is.

(ii) For each of the candidate sub-images Is obtained in the previous step (i), the center of the picture C2 of the mirrored view of the second camera in the second image I2 is roughly estimated using various selected values of the relative focal length $H_2$ of the second camera 104, and various selected distance values d between the second camera 104 and the object 120.

Accordingly, in step S208, the distance ratio of a first distance between two points of the portable device 100 in reality and a second distance of the respective points in the second initial image is determined to obtain the direction and the length of a mirroring vector pointing from the center of the second camera 104 to the center of the virtual second camera 105 (see FIG. 1).

Let $p_1$ and $p_2$ be arbitrary points shown in the first initial image I1. Assuming that both arbitrary points $p_1$, $p_2$ have the same distance d from the second camera 104 in the first camera's coordinate system, their actual coordinates $P_1$, $P_2$ in the coordinate system of the first camera 102 can be readily calculated.

Let $q_1$ and $q_2$ be two (mirrored) points of to $p_1$ and $p_2$, respectively, shown in the second initial image I2. It is noted that these points $q_1$, $q_2$ can be approximately identified in the second image I2 by using the position of the best matching sub-image Is within the second initial image I2. The actual coordinates $Q_1$, $Q_2$ of the points $q_1$, $q_2$ depend on their z-coordinate (depth) in the coordinate system of the virtual second camera 105, but since they coincide with $P_1$ and $P_2$ and the distance therebetween is known, the coordinates $Q_1$, $Q_2$ in the coordinate system of the virtual second camera 105 can also be readily calculated.

As a result of the above calculations, several candidates of the center $(c_x,c_y)$ of the picture C2 of the mirrored view of the second camera can be obtained, i.e. a search region 150 can be determined, however, $H_2$ and the distance ratio $$\left(\frac{d_{u_1,u_2}}{d_{U_1,U_2}}\right)$$

and hence the vector m is still not known.

Figure 4:
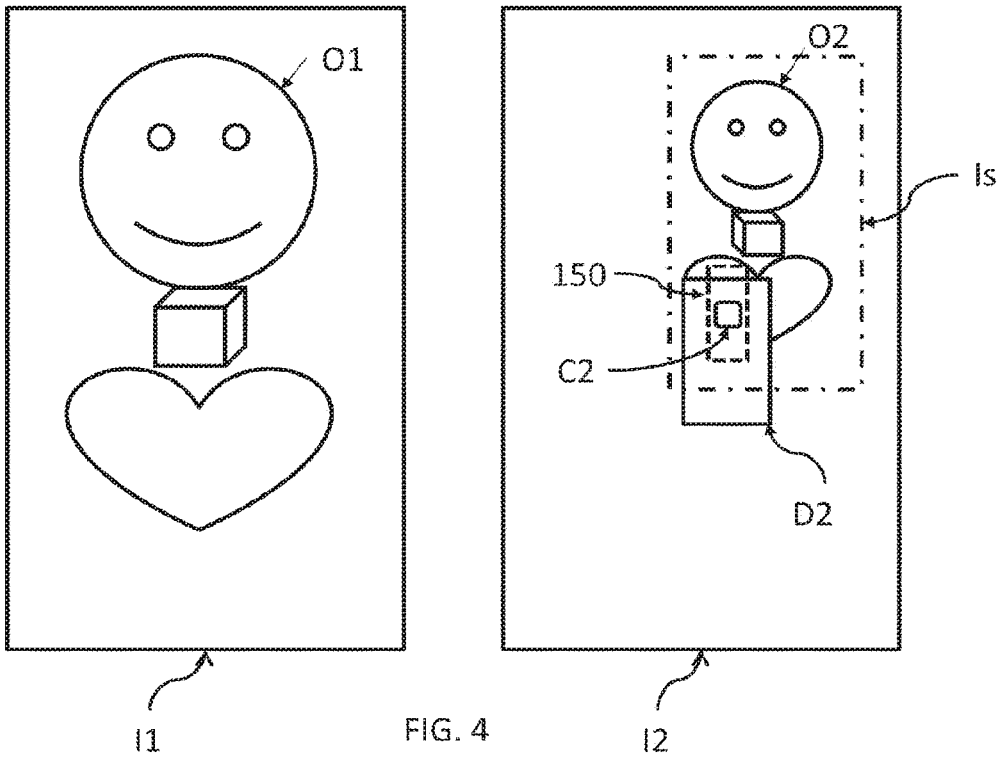
FIG. 4 shows a sub-image of the second initial image that is most similar to the first initial image and a search region in the second initial image where the picture of the mirrored view of the second camera is expected to be found.

FIG. 4 shows the sub-image Is of the second initial image I2 that is most similar to the first initial image I1 and the search region 150 estimating the expected location of the picture C2 of the mirrored view of the second camera 104 in the second initial image I2.

2) Next, the distance ratio $$\left(\frac{d_{u_1,u_2}}{d_{U_1,U_2}}\right)$$

is determined as follows.

First, two arbitrary reference points $u_1$, $u_2$ of the device 100 are selected. It is assumed that their distanced $d_{u_1,u_2}$ is known in the real world. As a next step S208, these points $u_1$, $u_2$ are to be found in the second initial image I2 for determining the length of the vector m.

Let $U_1$ and $U_2$ be the image coordinates of the two selected points $u_1$, $u_2$ of the device 100. The coordinates of these points $u_1$, $u_2$ are denoted by $R_1$ and $R_2$, respectively, in the coordinate system of the virtual second camera 105. Furthermore it is assumed that the depth (z-coordinate) of these points $u_1$, $u_2$ in the coordinate system of the virtual second camera 105 is roughly equal. Accordingly, $$U_{1,x} = R_{1,x}\frac{f}{sR_{1,z}}$$

$$U_{1,y} = R_{1,y}\frac{f}{sR_{1,z}}$$

and the same stands for $R_2$ and $U_2$. Here f/s is the relative focal length $H_2$ of the second camera 104. Although $R_1$ and $R_2$ are not known, but it is assumed that $R_{1,z}$ is approximately equal to both denoted commonly by $R_z$. Accordingly, $$U_{1,x}-U_{2,x}=(R_{1,x}-R_{2,x})H_2/R_z$$

$$U_{1,y}-U_{2,y}=(R_{1,y}-R_{2,y})H_2/R_z$$

Since $$d_{u_1,u_2}=\sqrt{(R_{1,x}-R_{2,x})^2+(R_{1,y}-R_{2,y})^2}$$

therefore $$d_{U_1,U_2} = d_{u_1,u_2}\frac{H_2}{R_z}$$

That means $$R_z = H_2\frac{d_{u_1,u_2}}{d_{U_1,U_2}}$$

Since the coordinates $R_1$ and $R_2$ are located on the portable device 100, it makes sense to assume that $R_z$ is equal to the length of m. (If one of the selected points $u_1$, $u_2$ on the portable device 100 was the second camera's center point, then $R_z$ would coincide with the end point of vector m.)

As a further step, the pictures of the two selected points $u_1$, $u_2$ of the portable device 100 in the second initial image I2 are to be found. To this end, one of the possible techniques is to find the pictures of the corners of the portable device 100, or for example, the distance d between the picture of flash and picture of the second camera's lens in the second initial image I2, which can be performed by any appropriate edge-detection technique in the second initial image I2.

Upon obtaining a set of hypothetical positions for the picture C2 of the mirrored view of the second camera 104 within the second initial image I2, a filtering is carried out for all of the possible positions of the picture C2 of the mirrored view of the second camera 104 in the search area 150 of the second initial image I2 (this search region is defined by the output of step S206) to find a limited set of likely positions and distance ratios thereof. This can be done, for example, by averaging edge-strength values in various regions of the search area that are specific to the particular portable device 100. For speeding up this processing, a pre-stored picture of an edge map of the portable device may be used.

Figure 5:
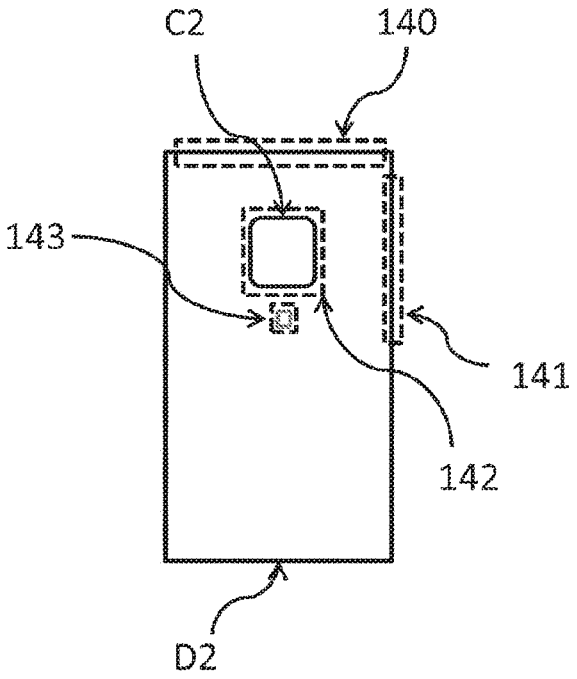
FIG. 5 shows a typical edge map of a portable device, the edge map showing predefined edge boxes.

In FIG. 5 a typical edge map of a portable device is shown, wherein the edge map contains a picture D2 of the mirrored view of the portable device with marked side edge boxes 140, 141, a frame box 142 of the second camera lens and a box 143 surrounding the flash lamp of the portable device. As a result, specific camera positions (center and size of picture C2) in the previously defined search region 150 in the second initial image I2 can be located.

Next, the estimated position of the picture C2 of the mirrored view of the second camera 104 in the second initial image I2 is determined by searching for the specific rounded square contour of the frame of the second camera 104. This may be done using a standard generalized Hough transform, resulting in the recognition of the picture of said specific portion of the portable device 100 in the second initial image I2.

It should be noted that the above described steps of finding the second camera's picture C2 (or the picture of the frame around the camera lens) within the second initial image I2 is only one of the various possible algorithms to determine the camera's center $(c_x,c_y)$ and the distance ratio $$\left(\frac{d_{u_1,u_2}}{d_{U_1,U_2}}\right)$$

that are obvious for those skilled in the art, and therefore it no way means any limitation of the present invention to such a specific search technique. The length of the vector m can then be calculated using the above equations.

3) Finally, after having obtained the direction and the length of the vector m, only the focal length (or the corresponding relative focal length $H_2$) of the second camera 104 should be determined in step S210 for the mirror transformation matrix M.

In some cases the actual relative focal length $H_2$ of the second camera 104 may be obtained from a controller circuit of the second camera 104, and therefore it may be regarded known. However, when the relative focal length $H_2$ is not available, a good estimation for the focal length thereof may be given by various estimation techniques.

The focal length $f_2$ of the second camera 104 may be estimated in the following way. In general, it is carried out by creating several fundamental matrices F, with different values of the relative focal length $H_2$ (assuming that the pixel size s of the second camera is known), generating a series of candidate stereo image pairs, in which the first initial image I1 is mapped into the coordinate system of the virtual second camera 105 with the various fundamental matrices $F_i$, followed by choosing the stereo image pair that corresponds to the best stereo result. The capturing focal length of the second camera 104 is then determined from the relative focal length belonging to the best fundamental matrix $F_i$ of the best matching stereo image pair.

One possible technique to find the best estimate for the relative focal length $H_2$ of the second camera 104 uses the fact that the stereo disparity has a very low resolution near the epipole. Since the position of the epipole (i.e. the image of the focal point of the first camera 102) in the second initial image I2 is known when the picture C2 of the mirrored view of the second camera 104 has been found within the second initial image I2, the corresponding region of the first initial image I1 that best matches to the picture near the epipole where the portable device 100 does not occlude the object 120. Although the picture of the portable device 100 (and therefore the picture of the first camera 102) does not appear on the first initial image I1, the corresponding region can be still found, for example, by using various fundamental matrices $F_i$ and checking the correlation between associated sub-windows of the initial image pair.

Figure 6:
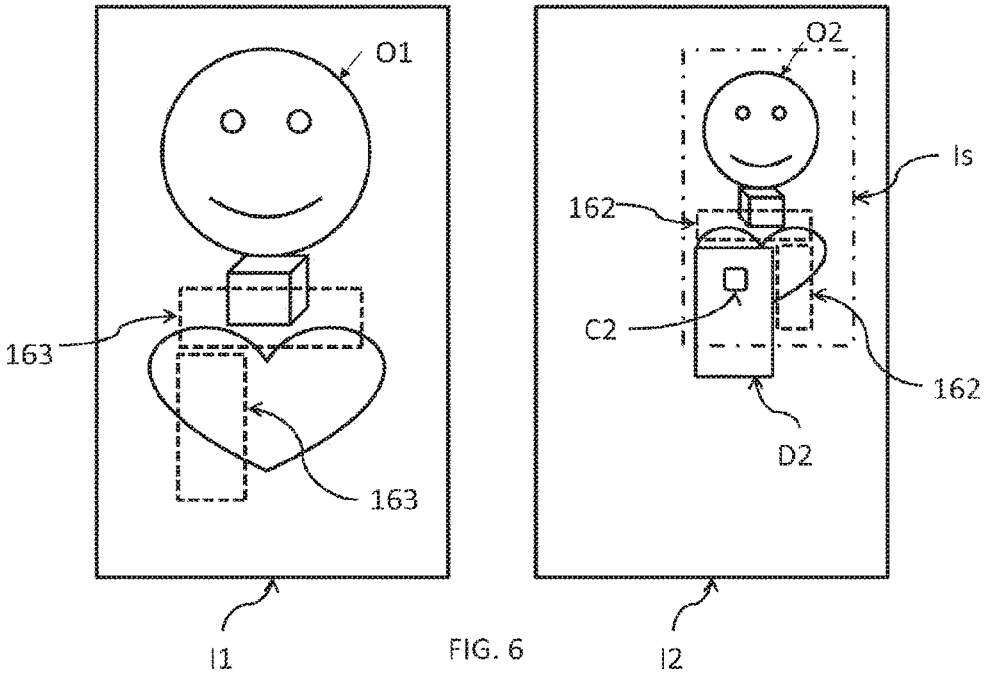
FIG. 6 shows the regions that are defined on the second initial image as being close to the second camera's center and the most similar image regions in the first initial image.
Figure 7:
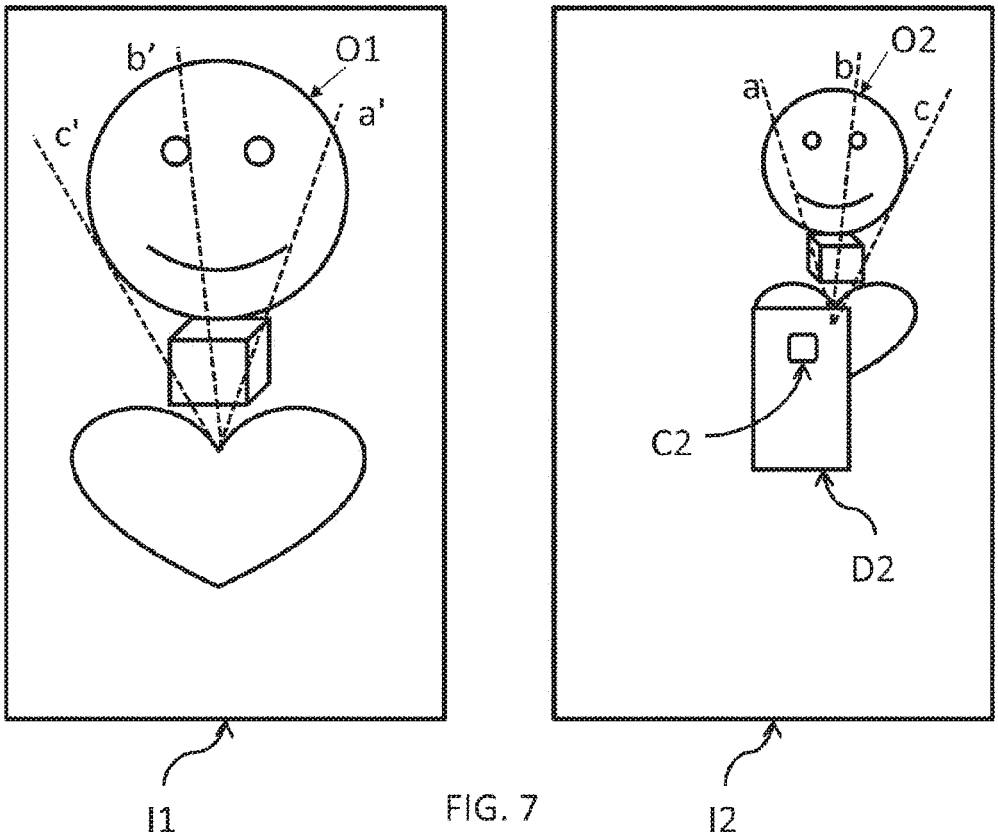
FIG. 7 shows the corresponding epipolar lines of the initial images.

These search regions 162, 163 are shown in FIG. 6, wherein the search regions 162 are the regions in the second image I2 for which the best matching search regions 163 in the first image I1 was previously round. Regardless of scale (defined by the fundamental matrix) the search region 163 of image I1 is expected to appear quite exactly (the color image correlation between the windows 162 and 163 are expected to be high) in the first initial image I1. These regions 163 are searched in the first image I1 with fundamental matrices defined by different values of the focal length of the second camera 104.

The focal length that refers to the best match, i.e. the highest correlation between the associated sub-windows, via the corresponding calibration matrix $F_i$, is the estimate for the actual focal length. This algorithm results in a stereo calibration matrix F that can be visualized by the epipolar lines shown in FIG. 7, in which the lines with the same reference sign (e.g. a, a'; or b, b', etc.) are mutually corresponding epipolar lines, i.e. any point on one of the initial images I1, I2 should belong to a real 3D point that has its picture on the other one of the images I1, I2 along the corresponding epipolar line (assuming that the mentioned point is not occluded).

Upon obtaining the best estimation for the relative focal length $H_2$ of the second camera 104, the mirror transformation matrix M is given, therefore the fundamental matrix F can be calculated using the formula F=M*K, and therefore in step S212, the coordinate system of the first camera 102 can be mapped into the coordinate system of the virtual second camera 105 to produce a stereo image pair for the object 120 from the initial images I1 and I2.

Once the stereo system used in the method of the invention is calibrated through the above steps, a depth estimation for a captured object may be performed to generate a depth image of the object. In particularly, when the object arranged in front of the portable device (i.e. in front of its first camera) is a human face, several characterizing parameters of the face can be estimated using the depth image thereof, including facial expression, position of the nose, the mouth, the eyes, lips, etc.

Once the 3-dimensional image of a human face is estimated, for example virtual glasses, make-ups, jewelleries, or the like, may be displayed over the captured images resulting in augmented reality. Using this augmented reality, for example, a software application running on the portable device may be used to take synchronized photos or video sequences by means of the front and rear cameras of a multi-camera portable device with using a mirror, and additional virtual objects may be displayed by the software over those images or video sequences, such as virtual glasses over the face of a user.

Figure 8:
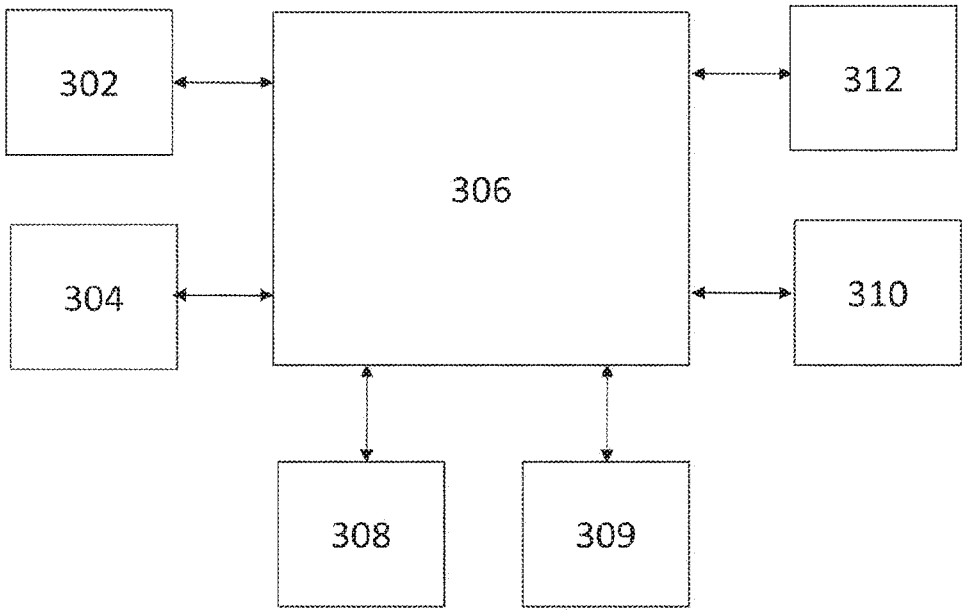
FIG. 8 is a schematic block diagram of the multi-camera portable device according to the present invention.

In a second aspect, the present invention relates to a multi-camera portable device for producing stereo images with using an external mirror. As shown in FIG. 8, the multi-camera portable device has at least two cameras 302, 304 at opposite faces thereof. Preferably, the multi-camera portable device 300 has at least one front camera 302 on its front side and at least one rear camera 304 on its backside. The multi-camera portable device 300 is adapted for performing the above described method of producing stereo images when an object to be captured is arranged in front of its front-side camera 302, and a mirror is arranged in front of its back-side camera 304. The multi-camera portable device 300 farther comprises all of those common components that are needed for the normal operation of such a device, including at least a processor unit 306, a memory unit 308, a non-transitory data storage medium 309, a display unit 310 and an input unit 312, wherein the multi-camera portable device 300 is configured to be capable of carrying out the steps of the methods according to the present invention. Preferably, the device 300 comprises a set of computer readable instructions either in its memory unit 308 or its non-transitory data storage medium 309, said instructions being adapted, when executed by the processor unit 306, to carry out the portable device-related steps of the method of the present invention.

In a third aspect, the present invention relates to a non-transitory data storage medium comprising a set of processor-readable instructions, said instructions being adapted, when executed by a processor of a multi-camera portable device, to carry out the steps of:

instructing a first image sensor of the device to record a first initial image containing a picture of an object arranged within the field of view of the first image sensor, and a second image sensor of the device to substantially simultaneously record a second initial image containing (i) a picture of a mirrored view of the object appearing in a mirror and (ii) a picture of at least a portion of a mirrored view of the multi-camera portable device itself appearing in the mirror, thereby to produce an initial pair of images, wherein said mirrored view of the second image sensor and said portion of the mirrored view of the device are arranged within the field of view of the second image sensor, finding the center of the picture of the mirrored view of the second image sensor within the second initial image, determining a distance ratio of a first distance between two points of the device in reality and a second distance of the respective points in the second initial image for obtaining a direction and a length of a mirroring vector, which points from the center of the second image sensor to the center of the virtual second image sensor, obtaining a capturing focal length of the second image sensor, and by using said mirroring vector and the capturing focal length of the second image sensor, transforming the coordinate system of the first image sensor into the coordinate system of the virtual second image sensor to generate a stereo image pair from the first initial image and the second initial image for the object.

I claim:

1. A method for producing a stereo image of an object with using a multi-camera portable device having at least two image sensors, at least a first one of said image sensors being arranged on a first face of the portable device and a second one of said image sensors being arranged on a second face of the portable device opposite to the first face thereof, the method comprising the steps of:

arranging the object in front of the first image sensor so that the object falls within the field of view of the first image sensor, arranging an external mirror in front of the second image sensor so that a mirrored view of the object and a mirrored view of the portable device fall within the field of view of the second image sensor, substantially simultaneously recording, by the first image sensor, a first initial image containing a picture of the object, and by the second image sensor, a second initial image containing (i) a picture of the mirrored view of the object appearing in the mirror and (ii) a picture of at least a portion of the mirrored view of the portable device appearing in the mirror, thereby producing an initial pair of images, finding the center of the picture of the mirrored view of the second image sensor within the second initial image, determining the distance ratio of a first distance between two points of the portable device in reality and a second distance of the respective points in the second initial image for obtaining the direction and the length of a mirroring vector, which points from the center of the second image sensor to the center of the virtual second image sensor, obtaining a capturing focal length of the second image sensor, and by using said mirroring vector and the capturing focal length of the second image sensor, transforming the coordinate system of the first image sensor into the coordinate system of the virtual second image sensor to generate a stereo image pair from the first initial image and the second initial image for the object.

2. The method of claim 1, wherein the multi-camera portable device is any one of a mobile phone, a smart phone, a phablet, a tablet computer, a notebook.

3. The method of claim 1, wherein finding the center of the picture of the mirrored view of the second image sensor in the second initial image comprises the steps of:

a. finding a sub-image within the second initial image, wherein said sub-image best matches to the first initial image, b. determining a plurality of candidate positions and sizes of the picture of the mirrored view of the second image sensor in the second initial image by using various selected values of the relative focal length of the second image sensor and various selected distance values between the second image sensor and the object to find the center point of the picture of the mirrored view of the second image sensor in said plurality of candidate positions in the second initial image, c. selecting a best estimate for the position and the size of the picture of the mirrored view of the second image sensor in the second initial image by using a standard generalized Hough transform.

4. The method of claim 1, wherein the capturing focal length of the second image sensor is obtained from a controller of the second image sensor.

5. The method of claim 1, wherein the capturing focal length of the second image sensor is obtained by performing the steps of:

a. creating several coordinate transformation matrices with different values of a relative focal length of the second image sensor for mapping the coordinate system of the first image sensor into the coordinate system of the virtual second image sensor, said relative focal length being defined as the ratio of the focal length and the pixel size of the second image sensor, b. generating a series of candidate stereo image pairs, wherein in each of the candidate stereo image pairs, the first initial image is transformed into the coordinate system of the virtual second image sensor with a different coordinate transformation matrix, and c. selecting the best matching stereo image pair, d. determining the capturing focal length of the second image sensor from the relative focal length belonging to the coordinate transformation matrix of the best matching stereo image pair.

6. The method of claim 1, wherein the method further comprises the step of producing a depth map of the object using the stereo image pair containing the object.

7. A non-transitory data storage medium comprising a set of processor-readable instructions, said instructions being adapted, when executed by a processor of a multi-camera portable device, to carry out the steps of:

instructing a first image sensor of the device to record a first initial image containing a picture of an object arranged within the field of view of the first image sensor, and a second image sensor of the device to substantially simultaneously record a second initial image containing (i) a picture of a mirrored view of the object appearing in a mirror and (ii) a picture of at least a portion of a mirrored view of the multi-camera portable device itself appearing in the mirror, thereby to produce an initial pair of images, wherein said mirrored view of the second image sensor and said portion of the mirrored view of the device are arranged within the field of view of the second image sensor, finding the center of the picture of the mirrored view of the second image sensor within the second initial image, determining a distance ratio of a first distance between two points of the device in reality and a second distance of the respective points in the second initial image for obtaining a direction and a length of a mirroring vector, which points from the center of the second image sensor to the center of the virtual second image sensor, obtaining a capturing focal length of the second image sensor, and by using said mirroring vector and the capturing focal length of the second image sensor, transforming the coordinate system of the first image sensor into the coordinate system of the virtual second image sensor to generate a stereo image pair from the first initial image and the second initial image for the object.

8. A method of producing a stereo image of an object with using a multi-camera device having at least two image sensors, the method comprising the steps of:

arranging a first image sensor on one side of a portable device and another image sensor on the opposite side of the portable device and an external mirror in front of the first image sensor in which the first image sensor captures a picture of an object and substantially simultaneously second image sensor captures picture of the mirrored image of the object and mirrored image of at least a portion of the portable device;

determining a distance ratio of a first distance between two points of the portable device in reality and a second distance of the respective points in the second initial image for obtaining the direction and the length of a mirroring vector, which points from the center of the second image sensor to the center of the virtual second image sensor; obtaining a capturing focal length of the second image sensor, and by using said mirroring vector and the capturing focal length of the second image sensor, transforming the coordinate system of the first image sensor into the coordinate system of the virtual second image sensor to generate a stereo image pair from the first initial image and the second initial image for the object.

*9. A method comprising:*

*obtaining a first image, the first image comprising a first picture of an object;*

*obtaining a second image comprising a second picture and a third picture, the second picture comprising a mirror view of the object, and the third picture comprising a mirror view of a camera;*

*identifying a center of the third picture comprising the mirror view of the camera;*

*determining a relative focal length defined for the camera;*

*determining a distance ratio based at least on the relative focal length for the camera and the center of the third picture comprising the mirror view of the camera;*

*determining a mirroring vector based on the distance ratio and the center of the third picture comprising the mirror view of the camera;*

*determining a coordinate transformation from a first coordinate system of the first image and a second coordinate system of the second image based at least on the distance ratio, the relative focal length of the camera, and the mirroring vector; and*

*generating a stereo image pair of the object based at least on the coordinate transformation from the first coordinate system of the first image and the second coordinate system of the second image.*

*10. The method of claim 9, further comprising measuring a distance associated with the object based on the stereo image pair of the object.*

*11. The method of claim 9, further comprising generating a depth image of the object based on the stereo image pair of the object.*

*12. The method of claim 9, further comprising generating a three dimensional (3D) rendering of the object based on the stereo image pair of the object.*

*13. The method of claim 9, wherein determining the coordinate transformation from the first coordinate system of the first image and the second coordinate system of the second image is based on a coordinate transformation associated with a coordinate system from a perspective of a camera taking the first image and a coordinate system from a perspective of a camera taking the second image.*

*14. The method of claim 9, wherein the second coordinate system of the second image comprises a coordinate system corresponding to the second picture comprising a mirror view of the object in the second image.*

*15. A non-transitory data storage medium comprising a set of processor-readable instructions that when executed by a processor cause the processor to execute a method comprising:*

*obtaining a first image, the first image comprising a first picture of an object;*

*obtaining a second image comprising a second picture and a third picture, the second picture comprising a mirror view of the object, and the third picture comprising a mirror view of a camera;*

*identifying a center of the third picture comprising the mirror view of the camera;*

*determining a relative focal length defined for the camera;*

*determining a distance ratio based at least on the relative focal length for the camera and the center of the third picture comprising the mirror view of the camera;*

*determining a mirroring vector based on the distance ratio and the center of the third picture comprising the mirror view of the camera;*

*determining a coordinate transformation from a first coordinate system of the first image and a second coordinate system of the second image based at least on the distance ratio, the relative focal length of the camera, and the mirroring vector; and*

*generating a stereo image pair of the object based at least on the coordinate transformation from the first coordinate system of the first image and the second coordinate system of the second image.*

*16. The non-transitory data storage medium of claim 15, wherein the method executed by the processor further comprises measuring a distance associated with the object based on the stereo image pair of the object.*

*17. The non-transitory data storage medium of claim 15, wherein the method executed by the processor further comprises generating a depth image of the object based on the stereo image pair of the object.*

*18. The non-transitory data storage medium of claim 15, wherein the method executed by the processor further comprises generating a three dimensional (3D) rendering of the object based on the stereo image pair of the object.*

*19. The non-transitory data storage medium of claim 15, wherein determining the coordinate transformation from the first coordinate system of the first image and the second coordinate system of the second image is based on a coordinate transformation associated with a coordinate system from a perspective of a camera taking the first image and a coordinate system from a perspective of a camera taking the second image.*

*20. The non-transitory data storage medium of claim 15, wherein the second coordinate system of the second image comprises a coordinate system corresponding to the second picture comprising a mirror view of the object in the second image.*

* * * * *